United States Patent [19]

Lahr et al.

[11] 4,043,101
[45] Aug. 23, 1977

[54] EDGER-TRIMMER HEAD INDEXING MECHANISM

[75] Inventors: Fred H. Lahr, Humboldt; Roger W. Murley, Medina, both of Tenn.

[73] Assignee: Rockwell International Corporation, Pittsburgh, Pa.

[21] Appl. No.: 434,869

[22] Filed: Jan. 21, 1974

[51] Int. Cl.² .............................................. A01G 3/06
[52] U.S. Cl. ...................................... 56/17.1; 56/17.5
[58] Field of Search ...................... 56/16.9, 17.1, 17.5; 403/103, 166

[56] References Cited

U.S. PATENT DOCUMENTS

| | | | |
|---|---|---|---|
| 3,221,481 | 12/1965 | Mattson et al. | 56/17.5 |
| 3,350,864 | 11/1967 | Sheps et al. | 56/17.5 |
| 3,561,199 | 2/1971 | Lay | 56/17.1 |

*Primary Examiner*—Louis G. Mancene
*Assistant Examiner*—Paul J. Hirsch

[57] ABSTRACT

An improved indexing means for a garden edger-trimmer having interengaging surfaces on the end of the handle and the head housing for selectively positioning the head.

3 Claims, 7 Drawing Figures

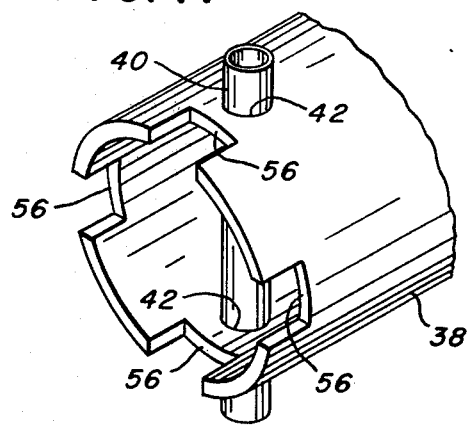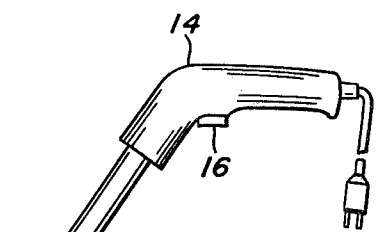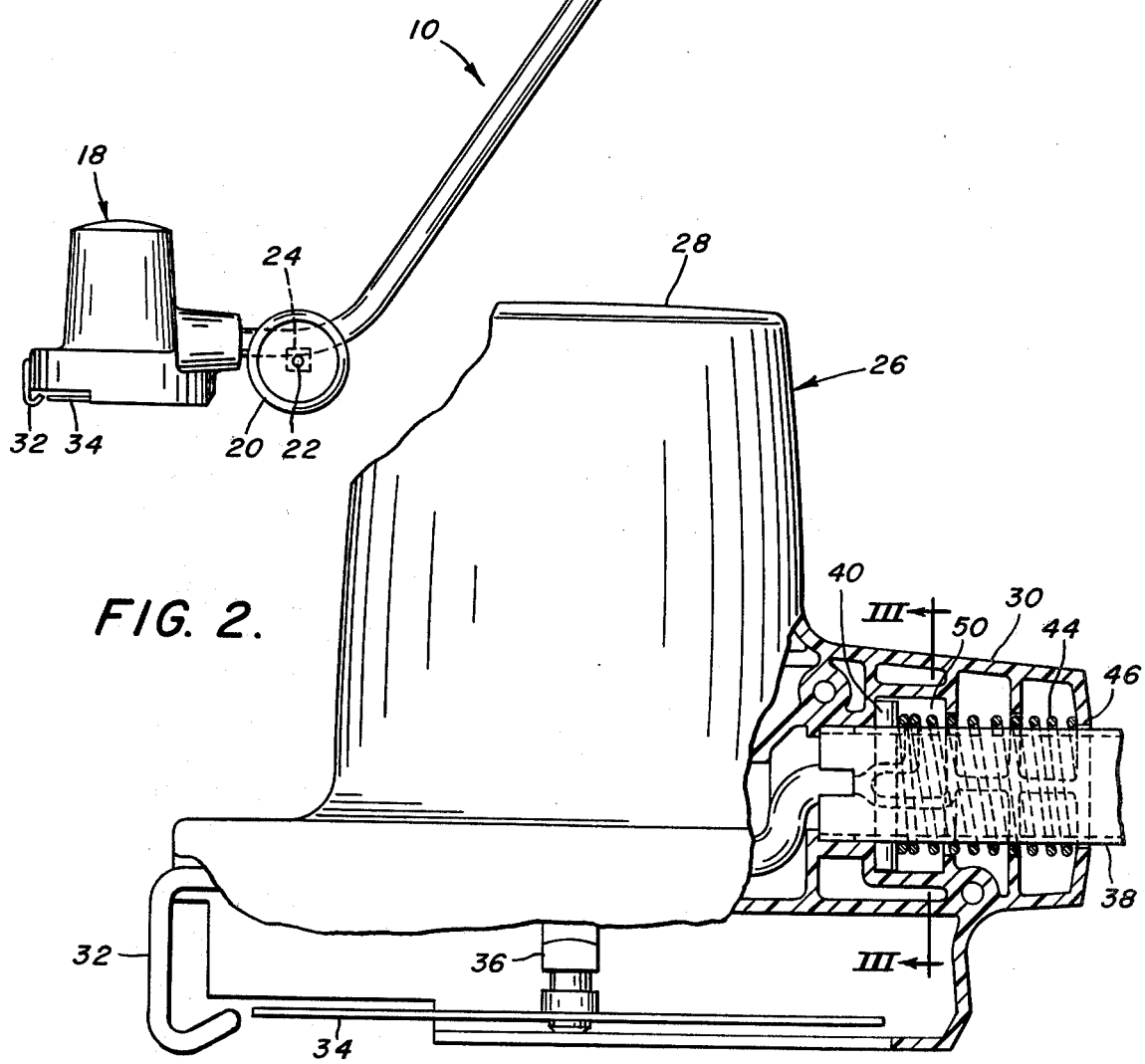

EDGER-TRIMMER HEAD INDEXING MECHANISM

BACKGROUND OF THE INVENTION

This invention is an improvement to a tool used for lawn maintenance, particularly adjacent buildings, walks, etc. Other known edger-trimmers use a sleeve or yoke around the bottom of the tubular handle for indexing the head and for mounting the ground-engaging wheels. These patents comprise the closest art of which I am aware; U.S. Pat. Nos. 3,034,275, 3,221,481, 3,330,102 and 3,561,199, and all use a collar or yoke fixed on, or adjacent to, the end of the tubular handle next the cutting head.

An object of the present invention is the provision of an improved indexing mechanism for retaining the cutting head of an edger-trimmer in a selected orientation relative to the handle and wheels.

Another object of this invention is to provide a simplified indexing mechanism with fewer parts, greater ease of operation, and simple assembly and repair procedures.

SUMMARY OF THE INVENTION

This invention pertains to a combination grass trimmer and edger having a housing containing an electric motor mounted for indexable rotation on an end of an elongated handle. The elongated handle also mounts a pair of ground-engaging wheels adjacent the housing, and a switch means in the other end adapted to be connected to the motor and to a source of power. The indexing mechanism consists of mating recesses and protuberances on the handle end and the housing, for selectively orienting the housing relative to the handle.

BRIEF DESCRIPTION OF THE DRAWINGS

FIG. 1 is a side view of an edger-trimmer, incorporating the present invention;

FIG. 2 is an enlarged view of the head of the edger-trimmer of FIG. 1 partly in section to show the connection to the handle;

FIG. 7 is a perspective view of the end of the handle removed from the head and from the surrounding coil spring.

DESCRIPTION OF THE PREFERRED EMBODIMENT

Figure 3:
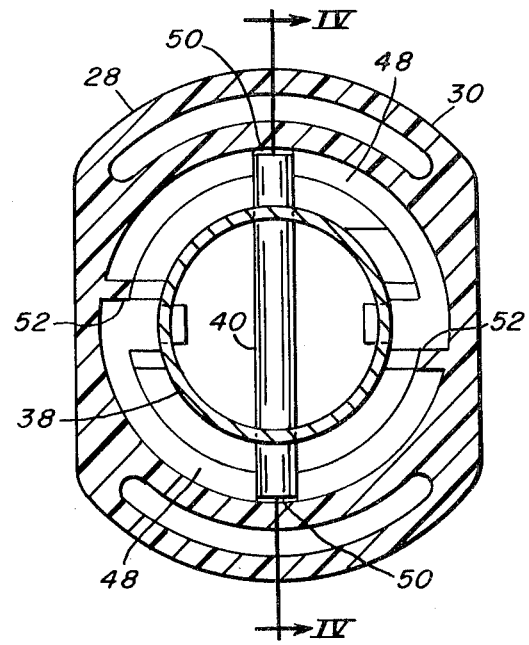
FIG. 3 is a sectional view taken along the section line III—III of FIG. 2, with the spring omitted for the sake of clarity.

FIG. 1 shows a side view of a lawn care tool 10 known as an edger-trimmer. This tool has an elongated handle member 12 with a hand-piece 14 mounted on the upper end. A switch 16 is mounted in the hand-piece for controlling the supply of electricity to the motor (not shown). The other end of the handle 12 is shaped to be operated parallel to the ground surface and has a head 18 attached thereto. Behind the head are wheels 20 (one shown in FIG. 1) for convenience in operating the unit along the ground. These wheels are mounted on an axle shaft 22 supported on the handle by brackets 24 (one shown in FIG. 1). The head 18 consists of a housing member 26 formed of two halves 28 and 30 which are designed to meet along a vertical longitudinal center line in a construction commonly known as "clam-shell". The front guard 32, the motor (not shown) and the assembly on the end of handle 12, to be described in more detail later, are all retained in position by this clam-shell construction. The cutting blade 34 is mounted on the extension of armature shaft 36 to be rotated thereby, and housing 26 is formed to guard the blade most of the way around its periphery, in a manner well known in the art.

Figure 4:
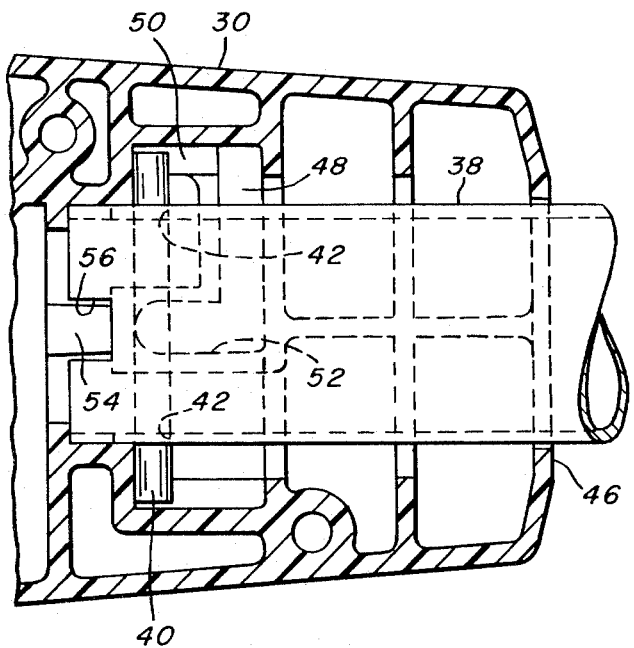
FIG. 4 is a sectional view taken along the section line IV—IV of FIG. 3, again with the spring omitted.
Figure 5:
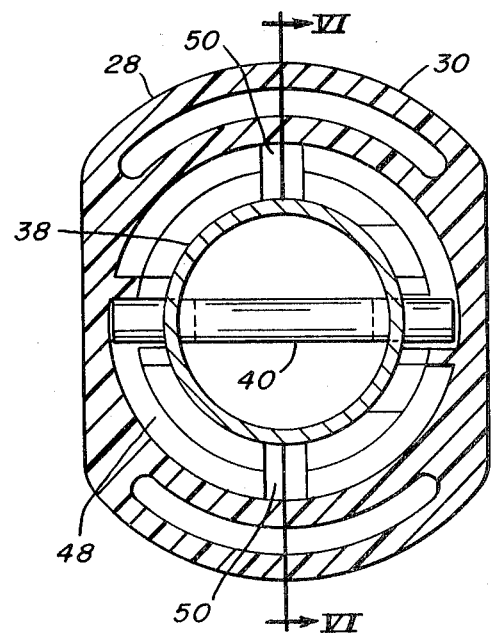
FIG. 5 is the same sectional view as FIG. 3, with the handle rotated 90 degrees to the other position; in use, it would be the head which is rotated, but the relative position of the head to the handle is the same.
Figure 6:
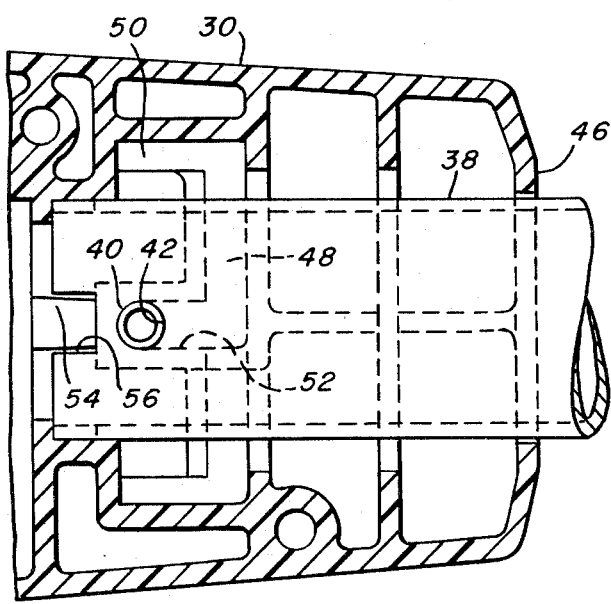
FIG. 6 is a sectional view taken along the section line VI—VI of FIG. 5.

The present invention is concerned with the attachment of head 18 on to handle 12, and the provision for positioning head 18 relative to handle 12. The lower end 38 of handle 12 has a pin 40 adjacent its end. Any projections 180° apart on the outside of the handle would answer, but the simplest construction was found to be pin 40 fixed in holes 42 near the end of the handle. Encircling the handle end 38 and having one end bearing against pin 40 is a coil spring 44 which has been purposely omitted from most of the views for greater clarity in the drawings. The other end of spring 44 bears against the end walls 46 of housing halves 28 and 30. This provides a biasing force urging handle end 38 forwardly (to the left as seen in FIGS. 1, 2, 4 and 6) into engagement with assembled housing 26. Upon being assembled with housing halves 28 and 30 being secured together, pin 40 in handle end 38 is trapped in a slot 48 formed in each of halves 28 and 30. As seen in FIGS. 4 and 6 (views of half 30, slot 48 extends approximately 90°. A view of half 28 would show a corresponding slot accommodating the lower end of pin 40. At these extremities of slot 48 are connecting longitudinal slots slightly larger than the external dimension of pin 40. These longitudinal slots 50 and 52 have centers 90° apart and interconnect with slot 48 at their rear end (right end as viewed in FIGS. 4 and 6) and extend toward the main body of the housing a distance at least sufficient to receive pin 40.

In addition to the locating slots 40 and 52 that cooperate with pin 40 to position the operating head 18 in a selected orientation, bosses 54 (one shown on housing half 30 in FIGS. 4 and 6) are located on housing halves 28 and 30 to cooperate with notches 56 to positively position head 18 and to assist pin 40 in retaining the head in the selected orientation. The sides of bosses 54 are very slightly tapered from front to back (right to left in FIGS. 4 and 6) to aid in easily seating them in notches 56 cut in the end of the handle.

To change the setting of the head relative to the handle, the head is manually pulled longitudinally forward on the handle, sliding pin 40 rearwardly in the slots 50 (or 52) in which it rested. This action also disengages bosses 54 from notches 56. Upon pin 40 reaching slot 48, the head may be rotated on handle 38 until pin 40 reaches the other longitudinal slot 52 (or 50). Upon release of the force resisting the spring bias, the pin 40 moves forwardly (to the left in FIGS. 4 and 6), and at the same time bosses 54 engage notches 56 in the end of the handle, positively positioning head 18 relative to handle 38 (and ground-engaging wheels 20) for the desired operation.

What is claimed is:

1. In a combination grass trimmer and edger having a housing mounted for selective rotation about one end of an elongated handle, an electric motor in said housing, a shaft-mounted rotatable blade operatively connected to said motor, ground-engaging wheels mounted near said one end of said elongated handle, switch means in the other end of said handle, means for connecting said motor to a source of electric power through said switch means, the improvement comprising: notches in said one end of said handle and internal bosses in said housing, said handle and said housing being spring biased into engagement with each other.

2. A tool for trimming and for edging grass, comprising a housing enclosing a motor and shaft-mounted cutter, an elongated handle having ground-engaging wheels mounted thereon, means for connecting said motor to a source of power, and drive means connecting said motor and said cutter, said housing being mounted on an end of said elongated handle adjacent said ground-engaging wheels and having internal bosses adapted for engagement with notches in the end of said handle for selectively arcuately positioning said housing relative to said handle and said ground-engaging wheels, and said housing also having an internal groove cooperating with a pin fixed in said handle for limiting longitudinal and rotational movement of said housing relative to said handle.

3. The tool of claim 2, wherein said housing and said handle are biased into mating engagement in selected positions by means of a spring surrounding said handle and having its ends abutting said housing and said pin, respectively.

* * * * *